US012461245B2

(12) United States Patent
Imhoff et al.

(10) Patent No.: US 12,461,245 B2
(45) Date of Patent: Nov. 4, 2025

(54) PRESERVING POSITIONING ACCURACY WITH AGE OF DATA

(71) Applicant: Raytheon Company, Arlington, VA (US)

(72) Inventors: Scott Allen Imhoff, Parker, CO (US); Marcus Alton Teter, Belgrade, MT (US); Mac Allen Cody, Richardson, TX (US); James J. Richardson, Temecula, CA (US)

(73) Assignee: Raytheon Company, Arlington, VA (US)

( * ) Notice: Subject to any disclaimer, the term of this patent is extended or adjusted under 35 U.S.C. 154(b) by 256 days.

(21) Appl. No.: 18/113,591

(22) Filed: Feb. 23, 2023

(65) Prior Publication Data
US 2024/0288589 A1 Aug. 29, 2024

(51) Int. Cl.
*G01S 19/02* (2010.01)
(52) U.S. Cl.
CPC .................. *G01S 19/02* (2013.01)
(58) Field of Classification Search
CPC .......... G01S 19/02; G01S 19/20; G01S 19/27; G01S 5/0294; B64G 3/00; H04B 7/19519
See application file for complete search history.

(56) References Cited

U.S. PATENT DOCUMENTS

| 11,544,492 | B2 | 1/2023 | Teter et al. |
| 11,546,001 | B2 | 1/2023 | Imhoff et al. |
| 11,733,390 | B2 | 8/2023 | Imhoff et al. |
| 11,977,170 | B2 | 5/2024 | Imhoff |
| 2012/0046863 | A1* | 2/2012 | Hope ............... G01S 19/393 701/531 |
| 2021/0341625 | A1* | 11/2021 | Gupta .............. G01S 19/243 |

OTHER PUBLICATIONS

Lionares, Richard, "AAS 19-821 Koopman Operator Theory Applied to the Motion of Satellites", Apr. 5, 2021 (Year: 2021).*
"European Application Serial No. 24157022.5, Extended European Search Report mailed Jul. 23, 2024", 7 pgs.
"European Application Serial No. 24157022.5, Response filed Feb. 13, 2025 to Extended European Search Report mailed Jul. 23, 2024", 63 pgs.

(Continued)

*Primary Examiner* — Cassi J Galt
(74) *Attorney, Agent, or Firm* — Schwegman Lundberg & Woessner. P.A.

(57) ABSTRACT

Embodiments regard improved satellite position determination with age of measurement data. A method includes receiving measurement data from a satellite, in a first iteration, increasing a dimensionality of the measurement data to a specified number of dimensions resulting in N-dimensional input data, performing dynamic mode decomposition on the N-dimensional measurement data resulting in a Koopman operator and modes of the N-dimensional measurement data, adaptive filtering a time domain residue resulting in a filtered residue, and updating, based on the filtered residue and a time domain deterministic component of the N-dimensional measurement data, a state vector of an object associated with the satellite measurement data.

20 Claims, 6 Drawing Sheets

(56) References Cited

OTHER PUBLICATIONS

Arnas, David, et al., "Approximate Analytical Solution to the Zonal Harmonics Problem Using Koopman Operator Theory", Arxiv.Org, Cornell University Library, 201 Olin Library Cornell University Ithaca, NY 14853, (Oct. 18, 2021), 34 pgs.

Brunton, Steven L, et al., "Modern Koopman Theory For Dynamical Systems", arxiv.org, Cornell University Library, 201 Olin Library Cornell University Ithaca, NY 14853, (Oct. 29, 2021), 110 pgs.

Koopman, B.O., "Hamiltonian Systems and Transformations in Hilbert Space", Proc. N.A.S., vol. 17, 1931, 315-318.

\* cited by examiner

PRESERVING POSITIONING ACCURACY WITH AGE OF DATA

TECHNICAL FIELD

Embodiments provide for improved positioning accuracy, in a satellite positioning system, with age of data. Embodiments employ a dimension-limited Koopman processing technique. Some embodiments include mode decomposition.

BACKGROUND

Satellite constellations that are used for navigation, including global positioning system (GPS), Galileo, and others, must maintain accurate knowledge, in space and time, of the locations of respective phase centers of the component satellites. Those component satellites transmit, to users, a message which declares the precise location of the phase centers at a given time. A user's ability to very accurately determine its own position in space and time by multilaterating, using several of these received satellite signals, depends directly upon the ability of the enterprise to maintain accurate knowledge of the locations in space and time of the phase centers of the component satellites or other points of reference. Measurement data on the locations of those phase centers is used to maintain accurate knowledge of the locations in space and time of the phase centers of the component satellites.

Maintaining accurate knowledge of the locations in space and time of the phase centers is done by processing the measurement data using an Extended Kalman Filter. Corrections to the state vector representing one or more satellites determined by the filter are then uploaded to the respective satellites, so that they can transmit accurate declarations of their position in space and time.

In an extremely adverse operating environment, such as if ground assets have been destroyed or disabled, it may not be possible to make these updates to position and time as frequently or at all. In this situation it becomes critical that the satellite positioning system be able to continue to propagate the state vector representing the state of each satellite with good accuracy of position and time (of the satellites). After some time, present types of Kalman Filters, Extended Kalman Filters, or other comparable filters experience growth in error of position and time (of the satellites) which is at least quadratic in growth or possibly worse. This is the problem of "age of data." This problem arises because performance for Extended Kalman Filters (EKFs) and comparable filters is better locally than globally.

DETAILED DESCRIPTION

Figure 1:
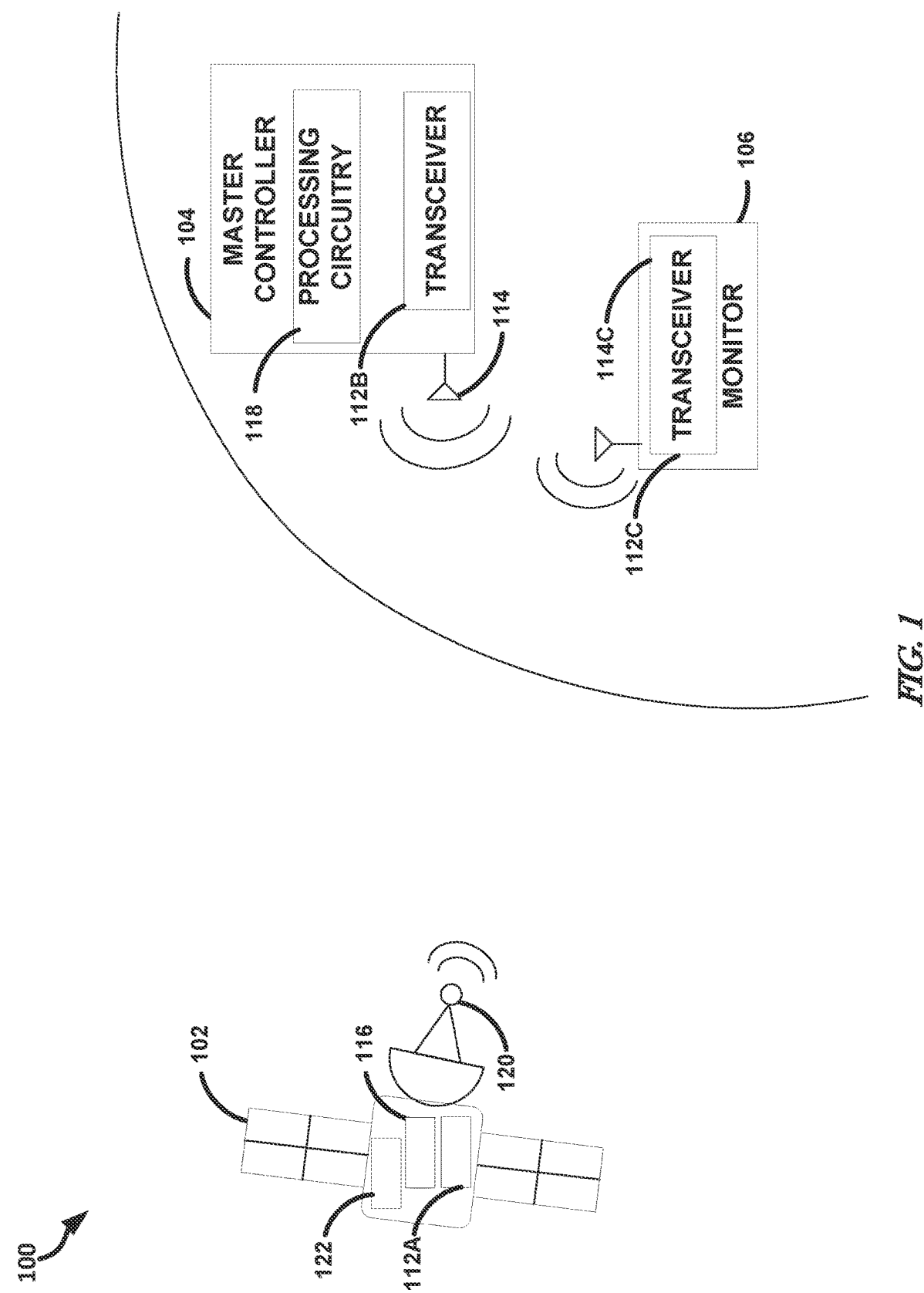
FIG. 1 illustrates, by way of example, an embodiment of a system that operates to determine a position of a device on a celestial body.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Koopman-type processing, including Koopman operators and the methods for determining them can perform well both globally and locally. Embodiments leverage the excellent global behaviors of the Koopman operator to better preserve position and time prediction for longer ages of data. A number of innovative ingredients can be combined to achieve one or more of the improvements.

An underlying principle of a Koopman operator is that, for nonlinear inputs, a linear representation is achievable at the cost of increasing the dimensionality of the representation. If the data is chaotic, the number of dimensions needed for perfect linear representation most often needs to be increased impracticably (e.g., to infinity), which limits utility for satellite positioning constellations which have caps on timeliness and processing. One unique attribute of embodiments is that they limit the dimensionality increase in the Koopman representation to a computationally manageable degree, N.

Embodiments then use dynamic mode decomposition to learn the prominent modes in that representation. Embodiments can then subtract those modes from the representation. Embodiments can then carry forward the deterministic component represented by the modes separately while passing the residue to an Extended Kalman filter (EKF) for further adaptive filtering, such as by using the EKF or other means.

The inputs to embodiments are the input measurement data, including observed position in space time, the rates of these, and/or other observations which covary with these, or an estimation of the same, and the limit, N, for the dimensionality increase. These inputs enter and are processed by a constrained Koopman processing operation. The constrained Koopman processing operation increases a dimensionality of a Koopman operator and the Koopman operator (constrained in its dimensionality) is determined using dynamic mode decomposition (DMD). The eigenfunctions output from the constrained Koopman processing operator and the Koopman operator are passed to a Koopman filtering operator. The Koopman filtering operator separates a Koopman-discovered deterministic component (KDDC) from a residue of the Koopman operator. In this way the majority of the deterministic portion of the input (the "low hanging fruit") is separated from a residue which may include a chaotic component. These separated components are sent to invert the Koopman operator so that the original dimensionality of the representation can be restored. The residue of the measurement data is provided to an adaptive filter (an EKF, particle filter, etc.) and the filtered residue and the KDDC are used to update a state vector of the corresponding satellite or constellation of multiple satellites. The state vector exhibits a reduced growth in position and timing error with increasing age of data because it has the benefit of the (constrained) Koopman representation. Improvements provided by embodiments include one or more of:

1. Embodiments use a superior global representation (meaning accuracy of representation over longer ages of data), as compared to Jacobian-type linearization in an EKF (or other truncated calculus type linearization), such as to better preserve position and timing accuracy over greater ages of data, such as when measurement data is denied.

2. Embodiments constrain the Koopman processing to a limited growth in dimensionality, dividing the work of state vector propagation between the Koopman related operations and the downstream adaptive filters. This sharing of the vector propagation work keeps all representations finite and within the computational means of practical implementations which usually have processing size and timeliness requirements.

3. The use of the Koopman operation here is isomorphic to the Fourier transform technique of filtering in the Fourier domain and then transforming the result back to the input domain. In embodiments, the data is transformed to a "Koopman Domain" by determining the Koopman operator, residual components in that operator are separated out, then the portion of the Koopman operator that is not residue (the KDDC) is reverted back to the dimensionality of the input domain.

4. The use of dynamic mode decomposition to identify the deterministic portions of the satellite measurement data in the Koopman operator and to filter the KDDC is unique.

5. Understanding and applying the economy at the heart of the position and time propagation problem is original: A higher degree of linearization can be purchased for an equal degree of increase in dimensionality; not relegating all of the analysis to the Koopman processes but passing some of that work to the downstream adaptive filters, purchases a better computational intensity for embodiments.

6. The parameter N is comparable to a slide on a mixing board in a music studio: The Koopman operator is grown iteratively and stops after N iterations. N is a slide that can set the extent to which the operator separates deterministic content from that which may be more stochastic.

7. Koopman linearization is typically used to determine local gradients. Koopman linearization has not previously been used to serve as a separator to sift out deterministic features in the Koopman domain before transforming back to the physical domain.

FIG. 1 illustrates, by way of example, an embodiment of a system 100 that operates to determine a position of a device on a celestial body. The system 100 as illustrated includes a satellite 102, a master controller 104, and a monitor station 106. For accurate position determination, the satellite 102 can provide the monitor station 106 or the master controller 104 an estimate of its position. The satellite position is determined as a function of a reference center of an antenna 120 of the satellite 102. The reference center of the antenna 120 is subject to change as the antenna 120 can be steered to sample different targets and the satellite is in motion. Using the phase center of the antenna as the reference center of the antenna provides an unambiguous positional reference for determining position based on time of arrival.

The satellite 102 can include a communication, remote sensing (e.g., weather, electromagnetic sensing, radio detection and ranging (RADAR), light detection and ranging (LIDAR), or the like), navigation (e.g., global positioning system (GPS), Galileo, or the like), internet, radio, television, manned, unmanned, or other satellite. The satellite 102 is generally any device capable of communication with the monitor 106 or master controller 104. The satellite 102 can be orbiting the Earth, whether in low Earth orbit (LEO), medium Earth orbit (MEO), or high Earth orbit (HEO) or could be a naturally occurring celestial body external to the Earth.

The satellite 102 as illustrated includes sensor(s) 116, a transceiver 112A, and an antenna 120. The transceiver 112A is a receive and transmit radio. The transceiver 112A receives electrical signals transduced by the antenna 120. The transceiver 112A can demodulate data from such signals. The transceiver 112A can modulate data onto electrical signals. The antenna 120 can convert the modulated electrical signals to an electromagnetic wave that is transmitted to the monitor 106. The data modulated onto the wave can include Keplerian element data, or equivalent navigational content, as determined by the sensor(s) 116, or a time as provided by a clock 122. The clock 122 of a satellite 102 is often an atomic clock with a very high time accuracy (e.g., with a maximum drift of about 2 nanoseconds a year). The sensor(s) 116 can include electro optical sensor(s) (e.g., visible, infrared (IR), or other electromagnetic radiation frequency sensor), three-axis accelerometer, gyroscope, temperature, weather, laser altimeter, lidar, radar, ranging instrument, scatterometer, sounder, radiometer, spectrometer, spectroradiometer, or the like.

Locations of satellites 102 can be determined using tracking from one or more monitors 106. The monitors 106 use mechanisms, such as radar, signal Doppler, and laser reflectors or measurement of time delay in a time-tagged signal received passively to pinpoint the position of a satellite and to maintain an understanding of its orbital elements and those metadata which covary with the elements of position and time. Given Keplerian orbital elements, or the equivalent representation of spatiotemporal position, orbital mechanics can be used to calculate where the satellite 102 is at a specific point in time, which may be instantiated by a multilateration performed by user equipment. Given the Keplerian elements, or the equivalent satellite position in spacetime in a specified frame, and a time stamp from the satellite 102, the monitor 106 can calculate the position of the satellite in spacetime 102 by performing multilateration.

Additionally, or alternatively, multilateration can be used by the master controller 104 to determine the position of the satellite in spacetime 102. Each of the monitors 106 can each receive a communication from the satellite 102. A time between the transmission of communication at the satellite 102 and reception of the communication at the monitors 106 can indicate how far away the satellite 102 is from the monitors 106. The distance to each of the monitors 106 can be used to determine the position of the satellite 102. This technique of satellite position determination tends to be more direct than the determination using the Keplerian elements.

The monitors 106 as illustrated include respective transceivers 112C and respective antennas 114C. The transceivers 112C modulate data to be provided to the master controller 104 and receive electrical signals from the satellite 102. The data to the master controller 104 will include an elapsed time between transmission of a communication from the satellite 102 and reception of the communication at the monitor 106. The data to the master controller 104 can further include sensor data from the sensor 116 of the satellite 102.

The master controller 104 as illustrated includes the transceiver 112B, the antenna 114B, and processing circuitry 118. The transceiver 112B demodulates electromagnetic waves from the monitors 106. The processing circuitry 118 performs operations on the received data (and other data) to determine spacetime position correction information for the satellite 102. The processing circuitry 118 can include electrical components configured to perform the operations on the received data. The processing circuitry 118 can include one or more resistors, transistors, capacitors, diodes, inductors, logic gates (e.g., AND, OR, XOR, negate, buffer, or the like), regulators (e.g., voltage, current, or power), amplifiers, power supplies, analog to digital converters, digital to analog converters, multiplexers, switches, buck or boost converters, or the like. The processing circuitry 118 can include a processing unit, such as can include one or more central processing units (CPUs), graphics processing units (GPUs), field programmable gate arrays (FPGAs), application specific integrated circuits (ASICs), or the like. Two or more of the processing units can operate in different number systems, such as in parallel.

The master controller 104 acts as a data processing center for information collected at the monitors 106. Orbit coordinates can be determined by multilateration and the orbit model (ephemeris). When the satellite drifts out of estimated orbit, reobtaining accuracy of estimated orbit can be undertaken. The clock 122 may also be readjusted, but more usually information on time errors is attached to signals as correction factors or correction summands. The computed corrections, time readjustments and repositioning information can be transmitted to the satellite via an uplink from the monitor 106.

In summary, satellite constellations used for navigation, including GPS, Galileo, GPS aided GEO automated navigation (GAGAN), and others, maintain accurate knowledge of the locations in space and time of the phase centers of the component satellites. Those component satellites transmit to users a message which declares the precise location of their phase center at a given time. An ability of a user device to accurately determine its own position in space and time by multilaterating using several of these received satellite signals depends directly upon the ability of the enterprise to maintain accurate knowledge of the locations in space and time of the phase centers of the component satellites or other point of reference. Measurement data on the locations of those phase centers is used to maintain accurate knowledge of the locations in space and time of the phase centers of component satellites.

This is typically done by processing the measurement data using adaptive filters such as an EKF. Corrections to the state vector representing one or more satellites determined by the adaptive filter are then uploaded to the satellites, so that they can transmit accurate declarations of their position in space and time. In an extremely adverse operating environment, such as if ground assets like the monitor 106 or master controller 104 have been destroyed or disabled, it may not be possible to make these updates to position and time as frequently or at all. This is the problem of age of data of the measurement data. In this situation it becomes critical that the enterprise is able to continue to propagate the state vector representing the state of each satellite with good accuracy of position and time (of the satellites) for longer ages of data that occur when there is a paucity of measurement data or further measurements are denied.

After some number of days without the ground assets, present types of EKFs (or comparable adaptive filters using a Jacobian or other truncated calculus as a linearization) experience growth in error of position and time (of the satellites) which is at least quadric or possibly worse. This is the problem of "age of data." This is owing to performance for KFs which is better locally than globally. Koopman-type processing, including Koopman operators and the methods for determining them, perform well both globally and locally because of the absence of arbitrary truncation of representational terms. The present embodiments leverage the excellent global behaviors of the Koopman operator to better preserve position and time prediction for greater ages of data with careful management of dimensions of representation rather than an arbitrary truncation of representational terms.

Figure 2:
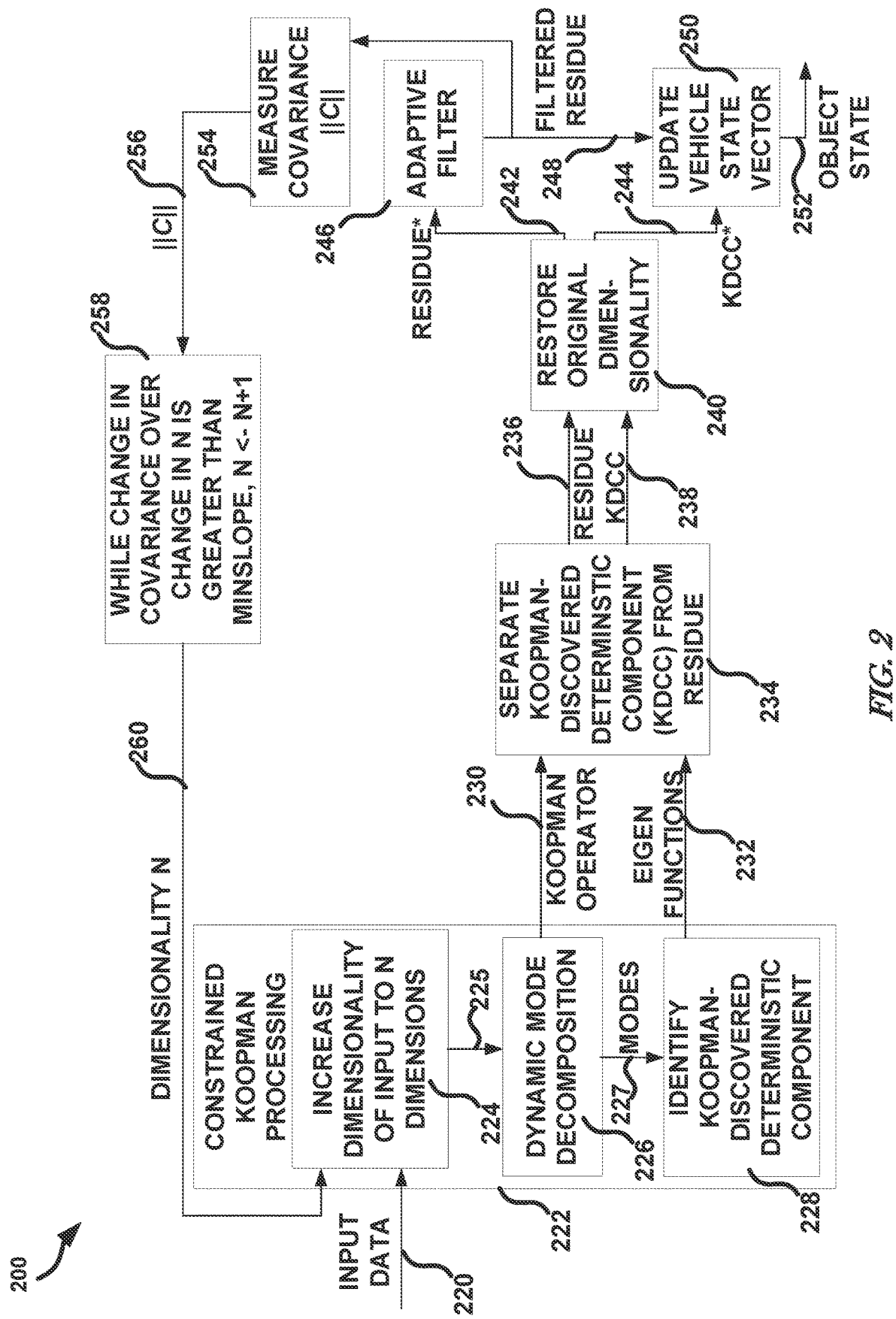
FIG. 2 illustrates, by way of example, a diagram of an embodiment of a method for improving satellite position accuracy with age of data.

FIG. 2 illustrates, by way of example, a diagram of an embodiment of a method 200 for improving satellite position accuracy with age of data. The method 200 as illustrated includes receiving input data 220, at a constrained Koopman processing operator 222. The input data 220 from the satellite 102 regarding their position. Such data is discussed regarding FIG. 1.

The constrained Koopman processing operation 222, in a first iteration, increases a dimensionality of the input data 220 to N dimensions. N is an integer greater than one. N can be user specified, optimized by a model, such as a machine learning (ML) model or a heuristic (rule-based) model, or the like. A result of the operation 224 is N-dimensional input data 225. The constrained Koopman processing operation 222 performs dynamic mode decomposition at operation 226. The operation 226 is performed based on the N-dimensional input data 225. The operation 226 includes identifying deterministic components of the state of the satellite 102 (orbital and metaorbital behavior) and separate those deterministic components from components which are higher-order nonlinear or stochastic, sometimes called the residue. The operation 226 discovers modes 227 of the N-dimensional input data 225 and a Koopman operator 230 of the N-dimensional input data 225. The Koopman operator 230 includes deterministic components and residue. An operation 228 identifies Koopman discovered deterministic components (KDDC) based on the modes 227. A result of the operation 228 is eigen-functions 232 of the modes 227.

At operation 234, the KDCC 238 is separated from the residue 236. More details on how to accomplish this are provided below regarding the operation 226 but the residue 236 appears as a separate term in the results of the operation 226.

At operation 240, the residue 236 and KDCC 238 are transformed from "Koopman domain" to time domain to restore an original dimensionality of the data. A result of the operation 240, is residue* 242 and KDCC* 244 in time domain. At this point in the method 200 the residue* 242 and KDCC* 244 are treated separately. An adaptive filter 246 processes the residue* 242 resulting in filtered residue 248. The adaptive filter 246 can include a KF, EKF, FLAGPASS, particle filter, a combination thereof, or the like. FLAGPASS is described in United States Patent Publication 2023-0046944, titled "Architecture for Increased Multilateration Position Resolution", and filed on Aug. 10, 2021, which is incorporated herein by reference in its entirety.

The filtered residue 248 and the KDCC* 244 are provided to operation 250 that updates the vehicle state vector resulting in an object state 252. The operation 250 processes the orbital and metaorbital behaviors to propagate satellite state with a low growth of positioning error.

The object state 252 represents the state of a satellite or a constellation of satellites. The items contained in the state vector are called its elements. Example elements of the object state 252 for a single vehicle is the elements of position X, Y, Z and clock T, and probably also the derivatives of these: X_dot, Y_dot, Z_dot. However, a state vector can contain not only the basics of position and time but normally also other elements that covary with these, such as solar pressure. For a navigation constellation, the object state 252 can contain several hundred elements. The elements of the object state 252 are variable and the examples provided here are non-exhaustive. The elements are typically chosen as basic spatiotemporal elements and other observations which covary with those. In the enterprise of maintaining knowledge of the satellite(s) state, the state vector is repeatedly re-estimated. When there is measurement data available, such as would be collected by monitor stations, the estimate of the state vector is updated using that measurement data.

Embodiments address the situation where something has gone wrong in the world (monitor stations denied) such that the EKF needs to do its best to estimate state without the benefit of fresh measurement data. The elapsed time since the most recent introduction of fresh measurement data is the Age of Data. Traditional EKFs lose accuracy of estimation of state rather quickly, but embodiments replace the EKF with a KKF (Koopman Kalman Filter) (the operations 222, 234, and 240 along with the filter 246) does not lose its positioning accuracy nearly as quickly.

The operations 254 and 258 are part of a control loop that helps constrain the dimensionality of the Koopman operator 230 and ultimately helps the method 200 converge with limited processing. At operation 254 a covariance 256 of the time series of the filtered residue 248 is determined. A goal can be to keep the filtered residue from growing more than specified amount per iteration. If, between iterations, the covariance 256 is greater than a (magnitude of a) specified threshold (minslope) (or less than a negative valued specified threshold), then N can be increased by 1 and the method 200 can continue another iteration at operation 222. If the covariance 256 is not greater than minslope, then the method 200 can terminate and the object state 252 from the most recent iteration can be used as the state vector for the satellite.

A simple example of some of the operations of the method 200 is now provided. Consider an input that is non-linear and from a satellite for which updates on position are limited or unavailable. An example of such an input is:

$$\dot{x}_1 = \mu x_1$$
$$\dot{x}_2 = \lambda(x_2 - x_1^2)$$

The input can be provided to the operation 224 to increase the dimensionality, which is currently 2 dimensions, to N dimensions, assume for this example that the dimensions are three (3) so no additional entries are needed. Using the operation 226, the Koopman operator 230 can be determined. The operation 226 can be performed on the data 225 as follows:

$$d/dt \begin{bmatrix} y_1 \\ y_2 \\ y_3 \end{bmatrix} = \begin{bmatrix} \mu & 0 & 0 \\ 0 & \lambda & -\lambda_2 \\ 0 & 0 & 2\mu \end{bmatrix} \begin{bmatrix} y_1 \\ y_2 \\ y_3 \end{bmatrix} \text{ for } \begin{bmatrix} y_1 \\ y_2 \\ y_3 \end{bmatrix} = \begin{bmatrix} x_1 \\ x_2 \\ x_1^2 \end{bmatrix}$$

Note that the nonlinear system of $\dot{x}_1$ and $\dot{x}_2$ has been linearized in the matrix equation above by using the Koopman linearization.

The Koopman operator 230 in this example is $$\begin{bmatrix} \mu & 0 & 0 \\ 0 & \lambda & -\lambda_2 \\ 0 & 0 & 2\mu \end{bmatrix}$$

and it appears as an eigenfunction in the derivative equation provided. The operation 226 can determine the operator 230 recursively and stops after N iterations. In this example N equals 1. Embodiments may serve applications for which the recursion stops for a value of N that is any whole number (0, 1, 2, . . . ).

Figure 3:
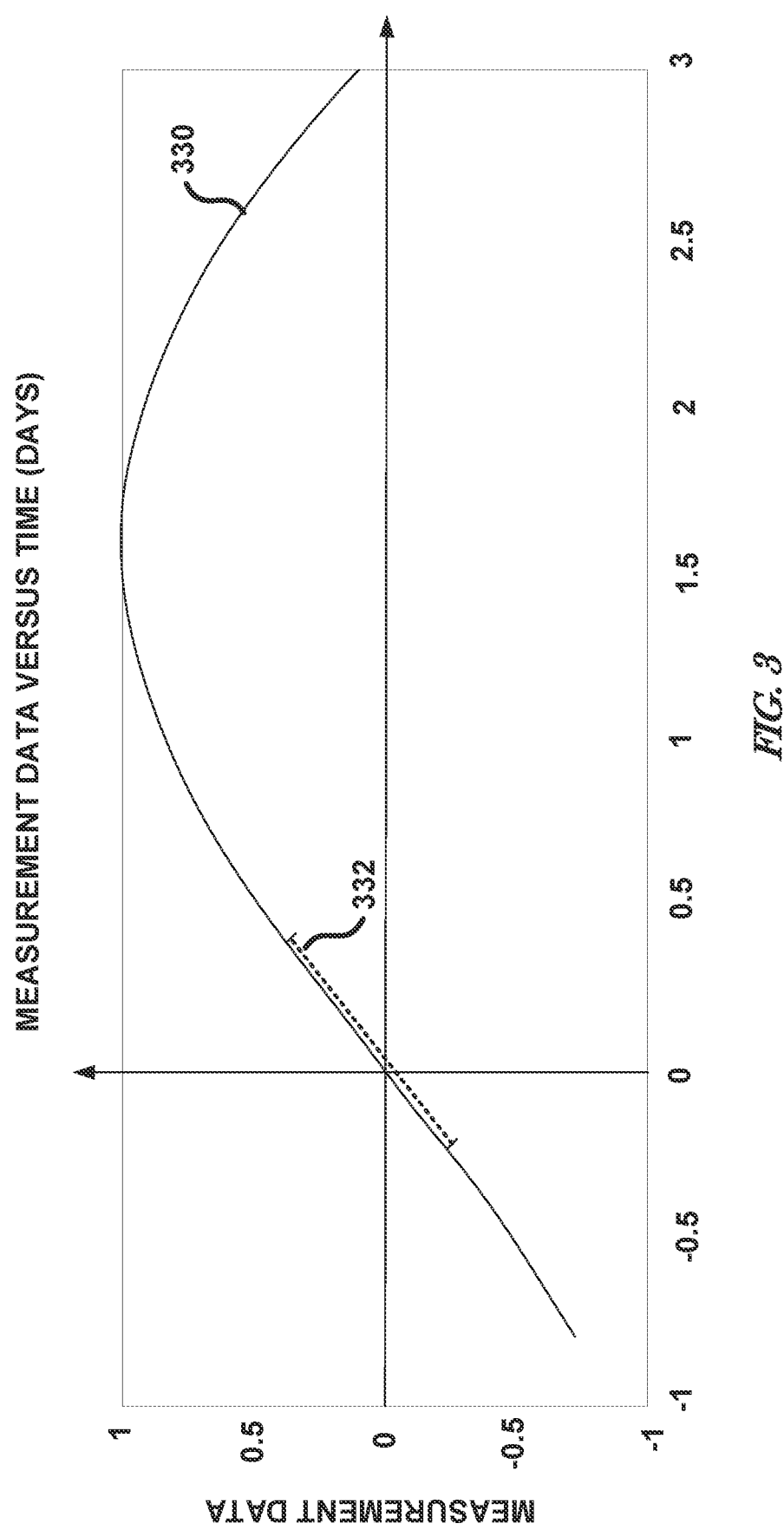
FIG. 3 illustrates, by way of example, a graph of example measurement data versus time for an example satellite.

FIG. 3 illustrates, by way of example, a graph of example measurement data versus time for an example satellite. The measurement data is represented by line 330 in the example of FIG. 3. The line 330 in the example of FIG. 3 is represented by the non-linear function $$t - \frac{t^3}{6} + \frac{t^5}{120} - \frac{t^7}{5040}.$$

A shorter line 332 represents a linear approximation of the satellite measurement data around time zero (the origin). In this region of the line 332, zero and first order terms predominate, regardless of the polynomial. If more, higher order derivatives are retained, one can more accurately represent the entire line 330, that is the measurement data can be represented with better accuracy globally than if only a small number of derivatives are kept. A problem with a calculus based technique is the truncation of terms beyond a certain derivative. For the quadratic system discussed previously, the Koopman operator achieved global representation by increasing the dimensionality from two to three dimensions. Thus, the Koopman operator use of increasing dimensions is directly related to the ability to invoke the equivalent of more derivatives to an optimal degree without arbitrary truncation and this is what provides better global representation. Global in this context means working better globally in time, that is, better performance with age of data. That is better estimation of measurement data versus age of data; therefore, better navigational positioning accuracy for the satellite constellation and its users when measurement data is reduced or denied, such as by an adversary or other adverse circumstances.

The operation 226 is a dimensionality management technique. Given a time series of data, DMD computes a set of modes each of which is associated with a fixed deterministic behavior. For linear systems in particular, these modes are analogous to the normal modes of the system, but more generally, they are approximations of the modes and eigenvalues of the composition operator (also called the Koopman operator). Due to the intrinsic spatiotemporal behaviors associated with each mode, DMD differs from dimensionality reduction methods such as principal component analysis, which computes orthogonal modes that lack predetermined spatiotemporal behaviors. Because its modes are not orthogonal, DMD-based representations can be less parsimonious than those generated by PCA. However, they can also be more physically meaningful because each mode is associated with a damped (or driven) deterministic behavior in time.

DMD was first introduced as a numerical procedure for extracting dynamical features from flow data. The data takes the form of a snapshot sequence $V_1^N = \{v_1, v_2, \ldots, v_N\}$ Where $v_i \in R^M$ is the $i^{th}$ snapshot of the flow field, and $V_1^N \in R^{M \times N}$ is a data matrix whose columns are the individual snapshots. These snapshots are assumed to be related via a linear mapping that defines a linear dynamical system $v_{i+1}=Av_i$, that remains approximately the same over the duration of the sampling period. Written in matrix form, this implies that $V_2^N = AV_1^{N-1} + re_{N-1}^T$, where r is the vector of residuals that accounts for behaviors that cannot be described completely by A, $e_{N-1}=\{0, 0, \ldots, 1\} \in \mathbb{R}^{N-1}$, $V_1^{N-1}=\{v_1, v_2, \ldots, v_{N-1}\}$, and $V_2^N=\{v_2, v_3, \ldots, v_N\}$. Regardless of the approach, the output of DMD is the eigenvalues and eigenvectors of A, which are referred to as the DMD eigenvalues and DMD modes, respectively.

The operation 222 is applied iteratively to the Koopman operator, a large square matrix, to increase its size and by so doing reduce the portion of the input data that is nonlinear. The example problem above was a 2×2 system which was quadratic, which is only one order from being linear. Therefore one application of DMD was used to increase the Koopman operator (the matrix) from 2×2 to 3×3 and convert the quadratic system to one which is linear. That is an example of linearization. Suppose a 2×2 matrix had cubic nonlinearity. In that case two applications of DMD would produce a 4×4 operator which would be linear.

For a satellite system, something like, for example, a dozen applications of the operation 222 that might grow the system from 7×7 to 19×19, or something like that. After the system has reached say 19×19, one might not have all of the nonlinearity converted to linear but might see a decline in the reduction of the covariance and that decline in improvement of covariance signals that they have realized all of the "low hanging fruit." Additional growth of the Koopman operator beyond 19×19 might not capture any more deterministic content (modes) because the residue might be primarily stochastic which is not something that the Koopman Operator can handle.

Figure 4:
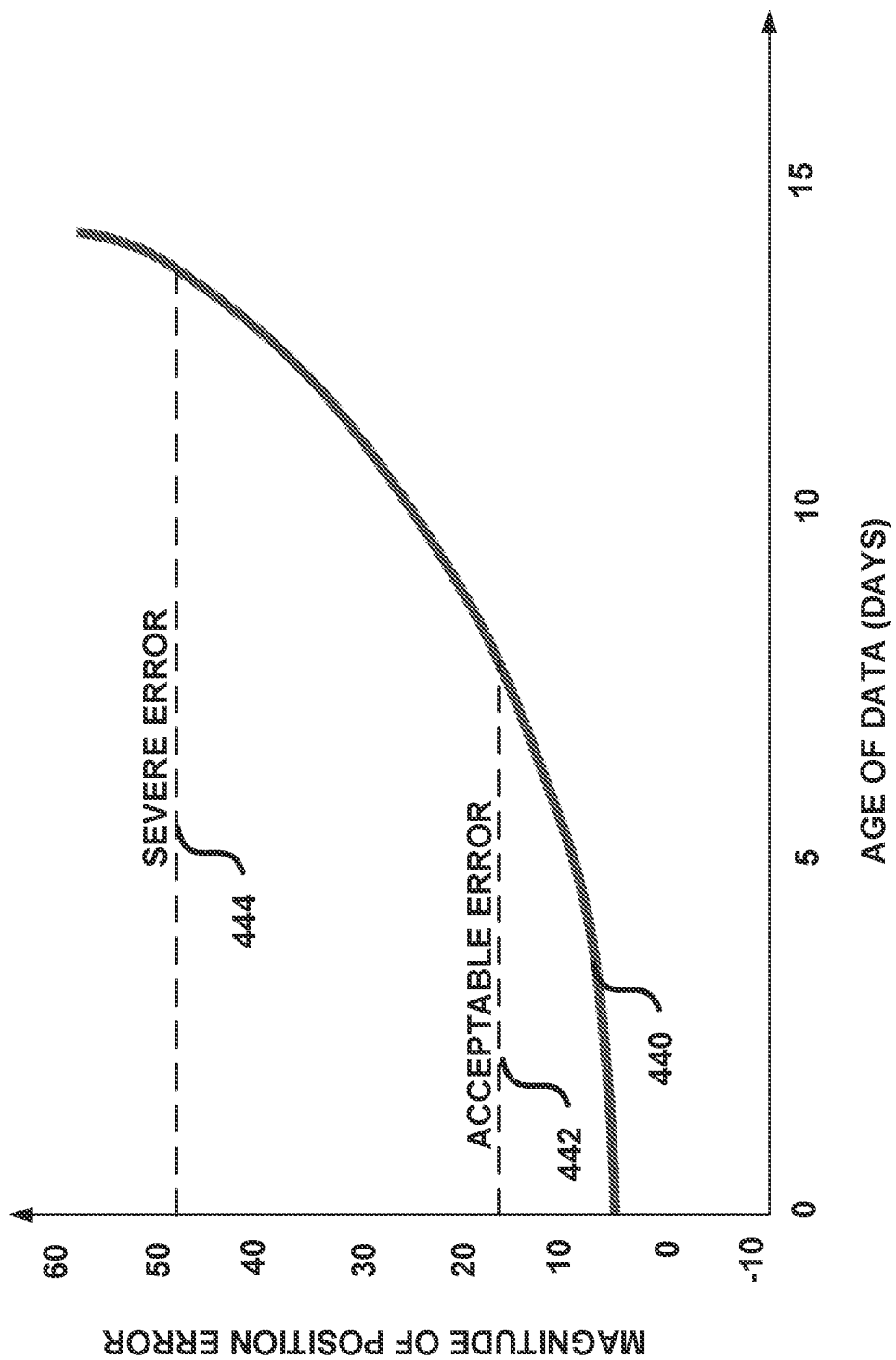
FIG. 4 illustrates, by way of example, a graph of error versus time for a typical EKF satellite position operator.

FIG. 4 illustrates, by way of example, a graph of error versus time for a typical KF satellite position operator. As can be seen, the position estimate (represented by line 110) exceeds an accuracy threshold (represented by line 112) after about a week. Embodiments, in contrast can retain the position estimate to within the acceptable error range (about 15% in the example of FIG. 4) for about fourteen days. At 14 days, in contrast, the typical EKF with Jacobian type linearization satellite position operator is experiencing severe error (as indicated by line 114).

Figure 5:
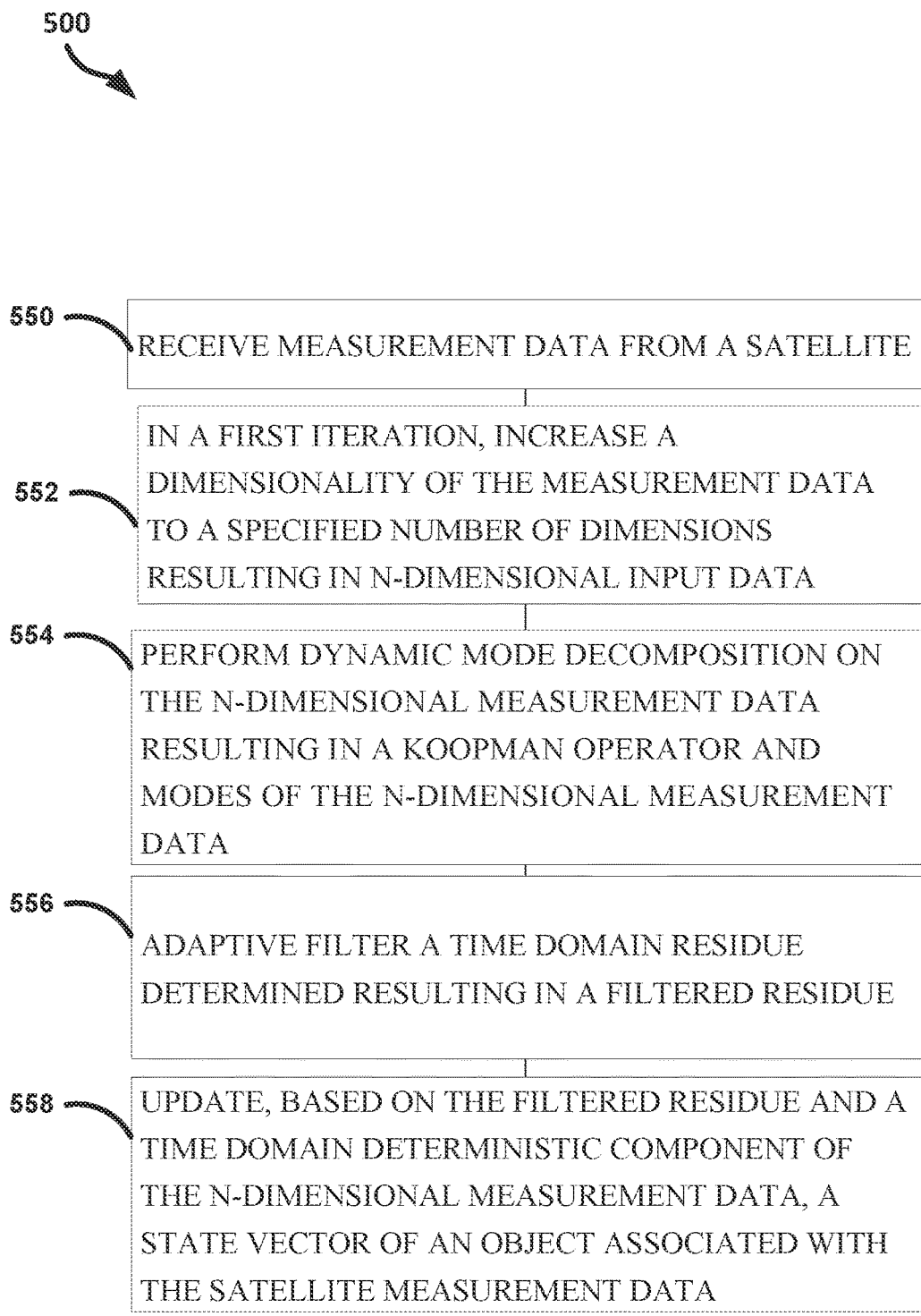
FIG. 5 illustrates, by way of example, a diagram of an embodiment of a method for improved satellite position with age of data.

FIG. 5 illustrates, by way of example, a diagram of an embodiment of a method 500 for improved satellite position with age of data. The method 550 as illustrated includes receiving measurement data from a satellite, at operation 550; in a first iteration, increasing a dimensionality of the measurement data to a specified number of dimensions resulting in N-dimensional input data, at operation 552; performing dynamic mode decomposition on the N-dimensional measurement data resulting in a Koopman operator and modes of the N-dimensional measurement data, at operation 554; adaptive filtering a time domain residue determined based on (i) the modes and (ii) the Koopman operator resulting in a filtered residue, at operation 556; and updating, based on the filtered residue and a time domain deterministic component of the N-dimensional measurement data, a state vector of an object associated with the satellite measurement data, at operation 558.

The operation 556 can include filtering using a Kalman filter, an extended Kalman filter, or FLAGPASS. The method 500 can further include determining a deterministic component of the modes of the N-dimensional measurement data resulting in eigen functions of the modes. The method 500 can further include separating the deterministic component of the modes from residue in the Koopman operator. The method 500 can further include inverting the residue and the deterministic component to time domain to restore an original dimensionality of the N-dimensional measurement data resulting in time domain residue and time domain deterministic component.

The method 500 can further include determining, based on of the filtered residue, a magnitude of a covariance of the filtered residue. The method 500 can further include, while a change in covariance divided by a change in the dimensions is greater than a specified minimum slope, incrementing the specified number of dimensions by a specified integer. The method 500 can further include, when the covariance is less than the specified minimum slope divided by the change in the dimensions, transmitting the object state vector to the satellite.

Figure 6:
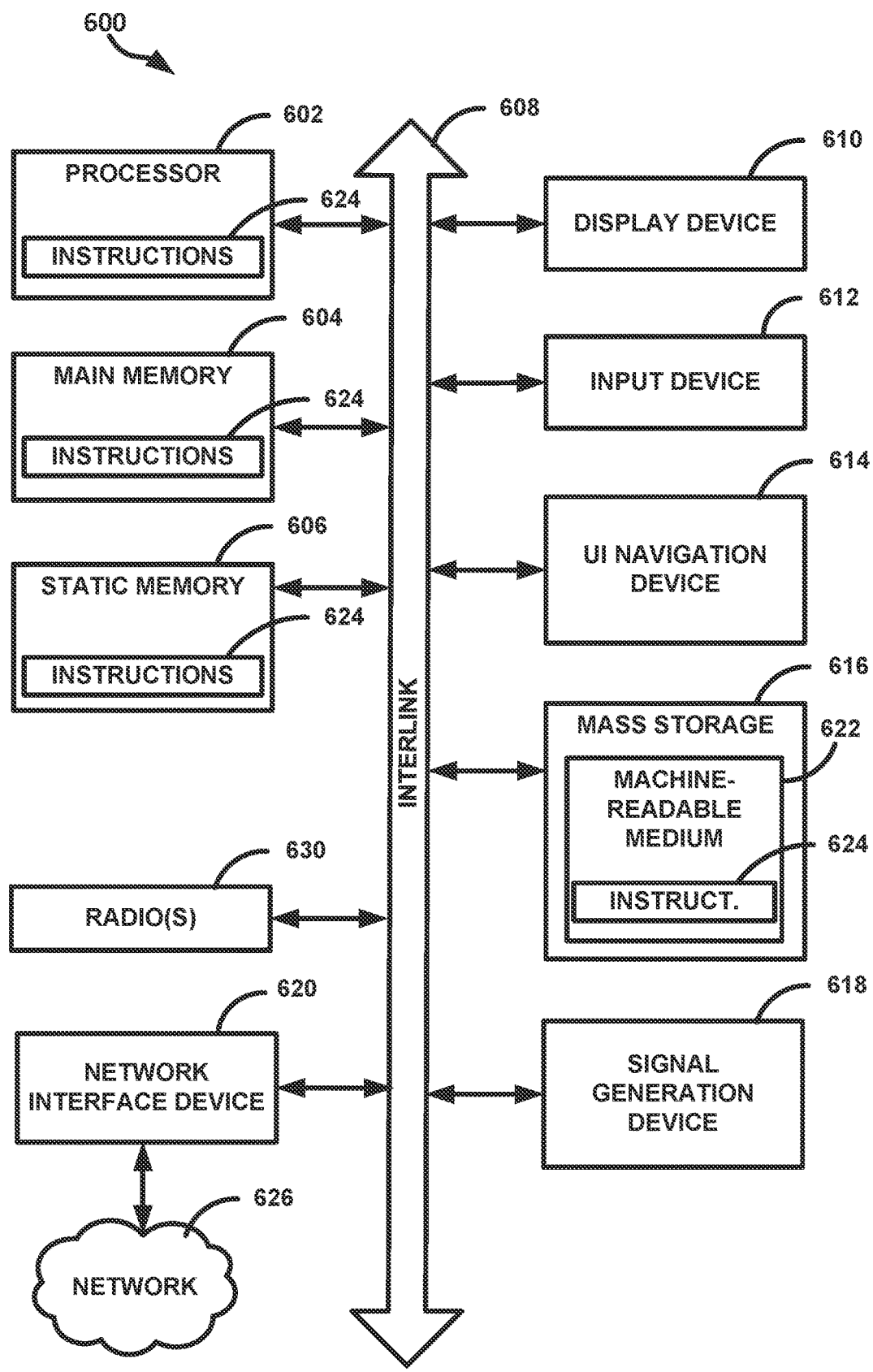
FIG. 6 illustrates, by way of example, a block diagram of an embodiment of a machine in the example form of a computer system within which instructions, for causing the machine to perform any one or more of the methods discussed herein, may be executed.

FIG. 6 illustrates, by way of example, a block diagram of an embodiment of a machine in the example form of a computer system 600 within which instructions, for causing the machine to perform any one or more of the methods discussed herein, may be executed. One or more of the satellite 102, monitor 106, controller 104, processing circuitry, transceiver 112A-112C, operations of the method 200 or method 500, can include, or be implemented or performed by one or more of the components of the computer system 600. In a networked deployment, the machine may operate in the capacity of a server or a client machine in server-client network environment, or as a peer machine in a peer-to-peer (or distributed) network environment. The machine may be a personal computer (PC), server, a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a mass storage unit 616, a signal generation device 618 (e.g., a speaker), a network interface device 620, and a radio 630 such as Bluetooth, WWAN, WLAN, and NFC, permitting the application of security controls on such protocols.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices: magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTPS). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Additional Notes and Examples

Example 1 includes a method for improved satellite position determination with age of measurement data and performed by a mater controller, the method comprising receiving measurement data from a satellite, in a first iteration, increasing a dimensionality of the measurement data to a specified number of dimensions resulting in N-dimensional input data, performing dynamic mode decomposition on the N-dimensional measurement data resulting in a Koopman operator and modes of the N-dimensional measurement data, adaptive filtering a time domain residue determined based on (i) the modes and (ii) the Koopman operator resulting in a filtered residue, and updating, based on the filtered residue and a time domain deterministic component of the N-dimensional measurement data, a state vector of an object associated with the satellite measurement data.

In Example 2, Example 1 further includes, wherein the adaptive filtering includes filtering using a Kalman filter, an extended Kalman filter, or FLAGPASS.

In Example 3, at least one of Examples 1-2 further includes determining a deterministic component of the modes of the N-dimensional measurement data resulting in eigen functions of the modes.

In Example 4, Example 3 further includes separating the deterministic component of the modes from residue in the Koopman operator.

In Example 5, Example 4 further includes inverting the residue and the deterministic component to time domain to restore an original dimensionality of the N-dimensional measurement data resulting in time domain residue and time domain deterministic component.

In Example 6, at least one of Examples 1-5 further includes determining, based on of the filtered residue, a magnitude of a covariance of the filtered residue.

In Example 7, Example 6 further includes, while a change in covariance divided by a change in the dimensions is greater than a specified minimum slope, incrementing the specified number of dimensions by a specified integer.

In Example 8, Example 7 further includes, when the covariance is less than the specified minimum slope divided by the change in the dimensions, transmitting the object state vector to the satellite.

Example 9 includes a non-transitory machine-readable medium including instructions that, when executed by a machine, cause the machine to perform the method of one of Examples 1-8.

Example 10 includes a system comprising processing circuitry, and a memory including instructions that, when executed by the processing circuitry, cause the processing circuitry to perform operations comprising the method of one of Examples 1-8.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instance or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A master controller comprising:
processing circuitry;
a memory including instructions that, when performed by the processing circuitry, cause the processing circuitry to perform operations for improved satellite position determination with age of measurement data, the operations comprising:
receiving satellite position data from a satellite, the satellite position data determined by the satellite and indicating an estimated position, in space, of the satellite;
in a first iteration, increasing a dimensionality of the satellite position data by one or more dimensions resulting in N-dimensional input data, where N is a positive integer;
performing dynamic mode decomposition on the N-dimensional input data resulting in a Koopman operator and modes of the N-dimensional input data;
adaptive filtering a time domain residue portion of the Koopman operator resulting in a filtered residue;
updating, based on the filtered residue and a time domain deterministic component of the Koopman operator, a state vector of the satellite associated with the satellite position data; and
a transceiver configured to communicate the state vector to the satellite to provide more accurate satellite position data than the satellite position data.

2. The master controller of claim 1, wherein:
the time domain residue is determined based on (i) the modes and (ii) the Koopman operator; and
the adaptive filtering includes filtering using at least one of a Kalman filter, an extended Kalman filter, or FLAGPASS.

3. The master controller of claim 1, wherein the operations further include determining a deterministic component of the modes of the N-dimensional measurement data resulting in eigen functions of the modes.

4. The master controller of claim 3, wherein the operations further comprise separating the deterministic component of the modes from residue in the Koopman operator.

5. The master controller of claim 4, wherein the operations further comprise inverting the residue and the deterministic component to time domain to restore an original dimensionality of the N-dimensional measurement data resulting in time domain residue and time domain deterministic component.

6. The master controller of claim 1, wherein the operations further comprise determining, based on of the filtered residue, a magnitude of a covariance of the filtered residue.

7. The master controller of claim 6, wherein the operations further comprise, while a change in covariance divided by a change in the dimensions is greater than a specified minimum slope, incrementing the specified number of dimensions by a specified integer.

8. The master controller of claim 7, wherein communicating the state vector to the satellite occurs responsive to determining the covariance is less than the specified minimum slope divided by the change in the dimensions.

9. A method for improved satellite position determination with age of measurement data and performed by a master controller, the method comprising:
receiving satellite position data from a satellite, the satellite position data determined by the satellite and indicating an estimated position, in space, of the satellite;
in a first iteration, increasing a dimensionality of the satellite position data by one or more dimensions resulting in N-dimensional input data, where N is a positive integer;
performing dynamic mode decomposition on the N-dimensional input data resulting in a Koopman operator and modes of the N-dimensional input data;
adaptive filtering a time domain residue portion of the Koopman operator resulting in a filtered residue;
updating, based on the filtered residue and a time domain deterministic component of the N-dimensional input data, a state vector of the satellite object associated with the satellite position data; and
communicating, by a transceiver of the master controller, the state vector to the satellite to provide more accurate satellite position data than the satellite position data.

10. The method of claim 9, wherein the adaptive filtering includes filtering using at least one of a Kalman filter, an extended Kalman filter, or FLAGPASS.

11. The method of claim 9, further comprising determining a deterministic component of the modes of the N-dimensional input data resulting in eigen functions of the modes.

12. The method of claim 11, further comprising separating the deterministic component of the modes from residue in the Koopman operator.

13. The method of claim 12, further comprising inverting the residue and the deterministic component to time domain to restore an original dimensionality of the N-dimensional input data resulting in time domain residue and time domain deterministic component.

14. The method of claim 9, further comprising determining, based on of the filtered residue, a magnitude of a covariance of the filtered residue.

15. The method of claim 14, further comprising, while a change in covariance divided by a change in the dimensions is greater than a specified minimum slope, incrementing the specified number of dimensions by a specified integer.

16. The method of claim 15, wherein communicating the state vector occurs responsive to determining the covariance is less than the specified minimum slope divided by the change in the dimensions.

17. A non-transitory machine-readable medium including instructions that, when executed by a master controller, cause the master controller to perform operations for improved satellite position determination with age of measurement data, the operations comprising:
receiving satellite position data from a satellite, the satellite position data determined by the satellite and indicating an estimated position, in space, of the satellite;

in a first iteration, increasing a dimensionality of the satellite position data by one or more dimensions resulting in N-dimensional input data, where N is an integer;

performing dynamic mode decomposition on the N-dimensional input data resulting in a Koopman operator and modes of the N-dimensional input data;

adaptive filtering a time domain residue of the Koopman operator determined based on (i) the modes and (ii) the Koopman operator resulting in a filtered residue;

updating, based on the filtered residue and a time domain deterministic component of the N-dimensional input data, a state vector of the satellite associate with the satellite data; and communicating, by a transceiver of the master controller, the state vector to the satellite to provide more accurate satellite position data than the satellite position data.

18. The non-transitory machine-readable medium of claim 17, wherein the adaptive filtering includes filtering using at least one of a Kalman filter, an extended Kalman filter, or FLAGPASS.

19. The non-transitory machine-readable medium of claim 17, wherein the operations further include determining a deterministic component of the modes of the N-dimensional input data resulting in eigen functions of the modes.

20. The non-transitory machine-readable medium of claim 19, wherein the operations further comprise separating the deterministic component of the modes from residue in the Koopman operator.

* * * * *